March 21, 1961 E. J. VOSLER ET AL 2,975,870
BRAKE BAND
Original Filed June 28, 1954 2 Sheets-Sheet 1
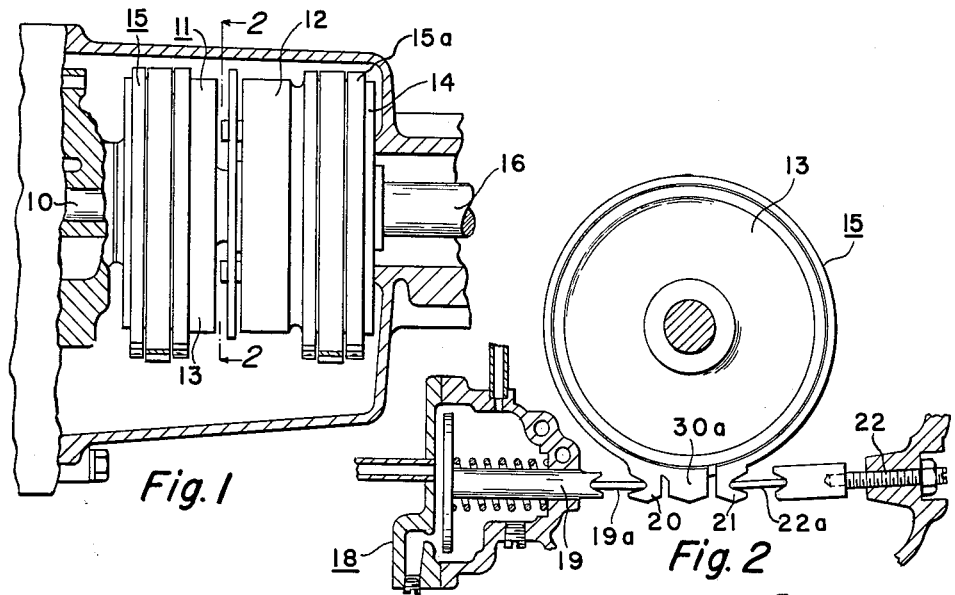
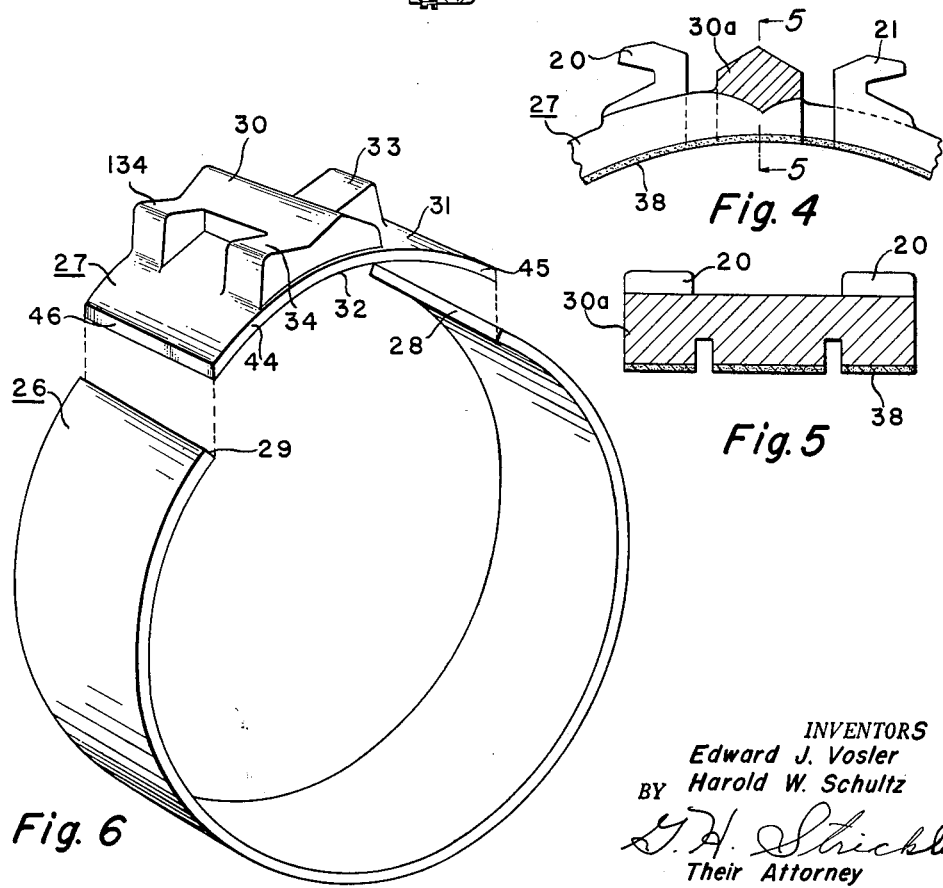
INVENTORS
Edward J. Vosler
BY Harold W. Schultz
G. H. Strickland
Their Attorney March 21, 1961 E. J. VOSLER ET AL 2,975,870
BRAKE BAND Original Filed June 28, 1954 2 Sheets-Sheet 2

INVENTORS
Edward J. Vosler
BY Harold W. Schultz

*G. H. Strickland*
Their Attorney

United States Patent Office 2,975,870
Patented Mar. 21, 1961

2,975,870

BRAKE BAND

Edward J. Vosler and Harold W. Schultz, Dayton, Ohio, assignors to General Motors Corporation, Detroit, Mich., a corporation of Delaware Original application June 28, 1954, Ser. No. 439,578. Divided and this application July 30, 1957, Ser. No. 675,087

3 Claims. (Cl. 188—77)

This invention relates to friction bands or brake bands. More specifically the invention relates to a friction band adapted for substantially double encirclement of a drum. A friction band or brake band of this type can be termed a double wrap band.

This is a division of application S.N. 439,578, Edward J. Vosler et al., filed June 28, 1954, now Patent No. 2,867,898.

An object of this invention is to provide a friction band, or brake band that effectively encircles a drum with at least two convolutions, the band being constructed in a manner as to eliminate any thrust angular to the axis of the band.

Another object of the invention is to provide a double wrap friction or brake band that has a radially expansible ribbon unitized at one end with an inflexible bar, which ribbon is disposed between a pair of substantially coextensively extending radially expansible ribbons positioned at each side of the first ribbon and unitized with the inflexible bar on the opposite side thereof, the centrally disposed ribbon and the outer ribbons each being disconnected from the bar on the side thereof opposite to connection of the ribbons with the bar, the free ends of the outer ribbons and the free end of the central ribbon each being provided with connecting means for engagement by actuating devices, the outer ribbons being adapted for actuation simultaneously in a direction opposite to actuation of the central ribbon whereby to effect counterbalancing of torque forces to eliminate angular torque thrust relative to the axis of the band upon contraction or expansion thereof.

Further objects and advantages of the present invention will be apparent from the following description, reference being had to the accompanying drawings wherein a preferred form of the invention is clearly shown.

Figure 1 is a cross sectional view of a part of an automatic transmission for a motor vehicle illustrating the use of the friction band or brake band of this invention.

Figure 2 is a cross sectional view along line 2—2 of Figure 1 but illustrating schematically certain controls and adjustments for the brake band.

Figure 4 is a cross sectional view taken along line 4—4 of Figure 3.

Figure 5 is a cross sectional view taken along line 5—5 of Figure 4.

Figure 6 is a perspective elevational view of the components from which the brake band of Figure 3 is manufactured.

Figure 3:
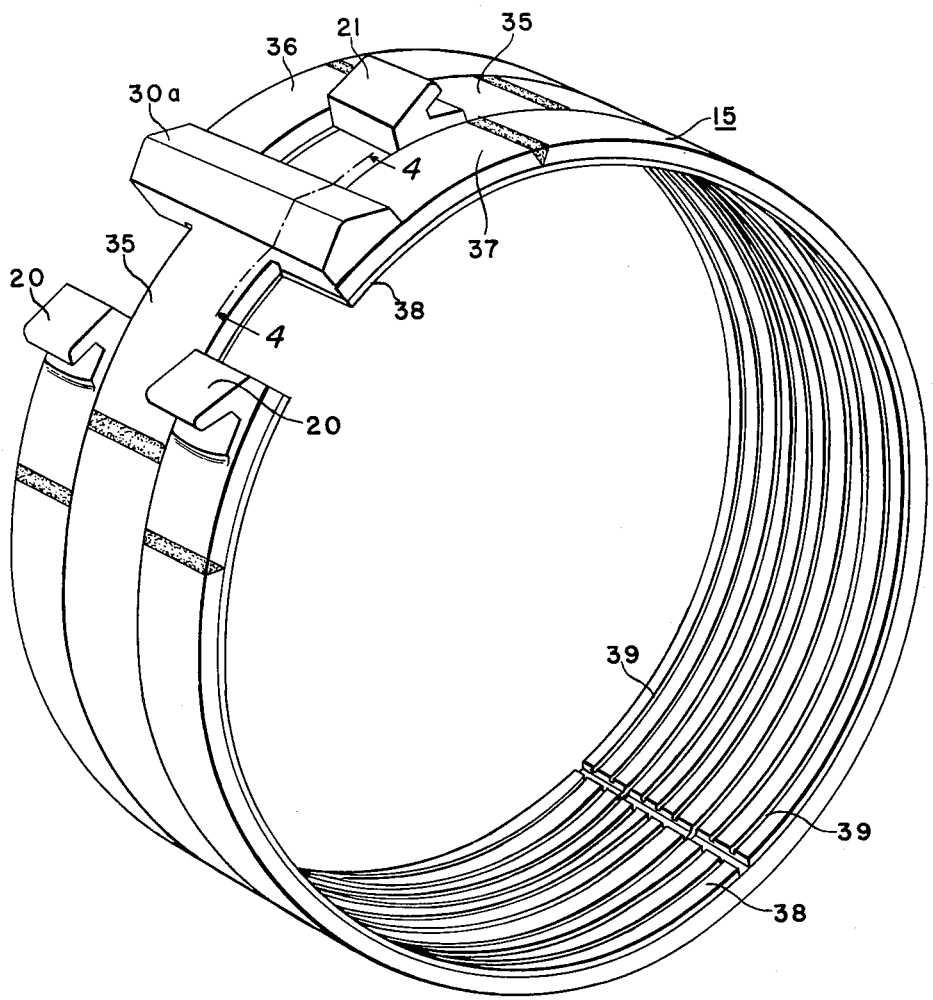
Figure 3 is a perspective elevational view of a brake.

The double wrap friction or brake band illustrated in Figure 3 is adapted for use in an automatic transmission schematically illustrated in Figures 1 and 2. In the conventional automatic transmission of the torque converter type there is provided a driven shaft 10 that extends from the torque converter of the fluid coupling type that is commonly known in the art today. Since the torque converter forms no part of this invention it is not illustrated or described.

The driven shaft 10 extends into a clutch and planetary unit comprising the clutch assembly 11 and a planetary assembly 12. The clutch assembly includes a clutch drum 13 around which there is placed a brake band 15 of the type of this invention. The planetary assembly 12 also includes a drum 14 around which there is placed a similar brake band 15a.

The brake bands 15 and 15a are contractable radially into engagement with the respective drums 13 and 14 to effect non rotation of these drums and thereby effect certain speed changes in the output shaft 16 or reverse rotation change to obtain operation under a low gear condition or for reversing but since the clutch unit and planetary unit per se form no part of the invention they are not disclosed or described specifically. It is merely the function of the brake bands 15 and 15a under suitable hydraulic controls to effect gear change and control of the direction of rotation of the output or drive shaft 16.

In Figure 2 there is illustrated schematically a control for the brake band 15 for contracting it upon the drum 13. The control comprises a hydraulically actuated motor 18 which upon receipt of fluid under pressure moves the plunger 19 in a right hand direction against the connecting lugs 20, more specifically shown in Figure 3. The connecting lug 21, also shown in Figure 3, is held stationary by an adjusting device 22 for regulating the clearance between the drum 13 and the brake band 15.

The brake bands 15 and 15a of Figure 1 are constructed in accordance with that illustrated in Figure 3 in their finished manufactured form. The brake band of Figure 3 is composed primarily of two elements illustrated in Figure 6, these elements being a cylindrically shaped steel band or strap 26 and a preformed forging or casting 27. The band or strap 26 is not a complete cylinder but has an open segment forming the ends 28 and 29. The forging or casting 27 forms a segment to close the open segment of the cylindrical band or strap 26 when the forging is placed between the ends 28 and 29 of the strap 26 and is bonded or welded thereto in a manner hereinafter described.

The forging or casting 27 comprises a segment portion 31 that is of substantially the same cross sectional thickness as that of the band or strap 26. The inner peripheral surface 32 of the segment 27 coincides with and completes the inner periphery of the cylinder formed by the strap or band 26. The outer peripheral surface of the segment 27 is provided with a boss 30 that extends transversely of the segment 27 and of the cylinder 26 and is parallel to the axis of the cylinder formed by the band or strap 26. This boss 30 forms the bar or inflexible connection 30a of the finished brake band illustrated in Figure 3.

On one side of the boss 30 there is provided a raised boss or lug 33. On the opposite side of the boss 30 there is provided the raised bosses or lugs 34 and 134, the lugs 34 and 134 being adjacent opposite ends of the boss 30 while the lug 33 is intermediate of the ends of the boss 30. The bosses 34 and 134 provide the connecting lugs 20 while the boss 33 provides a connecting lug 21 of the manufactured article as shown in Figure 3.

The friction or brake band of Figure 3 comprises an inflexible bar 30a from one side of which there extends a radially flexible ribbon 35 that is an integral part of the bar 30a and unitized therewith. The opposite end of the ribbon 35 carries the connecting lug 21. Also, the ribbon 35 is disposed intermediate opposite ends of the inflexible bar 30a. From the opposite side of the inflexible bar 30a there extends the radially flexible ribbons 36 and 37 that are an integral part of and are unitized with the bar 30a. These ribbons 36 and 37 extend substantially coextensively with the ribbon 35 with the opposite ends of the ribbons 36 and 37 carrying the lugs 20.

It will be noted that the central ribbon 35 extends from the side of the bar 30a from which the free ends of the ribbons 36 and 37 are disconnected and the ribbons 36 and 37 extend from the opposite side of the bar 30a from which the free end of the central ribbon is disconnected.

When the actuating device 19 through the links 19a engages the lugs 20 and tends to contract the brake band 15 upon the drum 13, the force applied will be directly opposite to the force applied through the stationary adjusting device 22 engaging the lug 21 through the link 22a. Thus the compressive forces for contracting the band are diametrically opposite so that there is no torque created in the brake band 15 that is angular to the axis of the band which would be imparted to the drum 13 tending to rotate the drum on its axis. The arrangement provides for more consistent operation of the clutch and planetary units of the automatic transmission.

The brake band 15 shown in Figure 3 is provided with a layer of friction material 38 that has the annular grooves 39 provided therein. The finished brake band illustrated in Figure 3 is in effect a one piece structure with the outer ribbons 36 and 37 being inflexibly connected with the inner ribbon 35 through the inflexible connecting bar 30a.

While the form of embodiment of the invention as herein disclosed constitutes a preferred form, it is to be understood that other forms might be adopted as may come within the scope of the claims which follow.

What is claimed is as follows:

1. A brake band for double encirclement and continuous engagement of the periphery of a drum comprising, a cylindrical sleeve having a boss projecting outwardly from the outer periphery of the sleeve transversely thereof, said boss being rigid in the direction of the axis of the drum, said sleeve having a pair of parallel slits extending peripherally around the sleeve from one side of the boss to the other forming thereby a central longitudinally extending ribbon disposed between coextensively longitudinally extending outer ribbons, said inner ribbon having one end portion fixedly connected with said boss and the opposite end disconnected therefrom, said outer ribbons each having one end portion fixedly connected with the opposite side of said boss on opposite sides of said central ribbon and the opposite ends thereof disconnected from said boss, said boss and said connecting end portions of said inner and outer ribbons forming a smooth cylindrical surface on their radially inner periphery.

2. A brake band for double encirclement and continuous engagement of the periphery of a drum, comprising, a bar support being rigid in the direction of the axis of the drum, a cylindrical ribbon member having one end portion fixedly connected with one side of said support intermediate the ends of said support and the opposite end of the ribbon positioned adjacent the opposite side of said support and disconnected therefrom, other cylindrical ribbon members at each of opposite sides of the first mentioned ribbon member and being substantially coextensive therewith and having one end portion of each thereof fixedly connected with said support on the opposite side from that from which said first mentioned ribbon member is fixedly connected and the opposite ends disposed adjacent said support and disconnected therefrom on the side thereof to which said first mentioned ribbon member is fixedly connected, said bar support with said connecting ends of said cylindrical ribbons forming a smooth cylindrical surface on their inner periphery.

3. A brake band for double encirclement of the periphery of a drum comprising, a cylindrical sleeve forming a smooth cylindrical inner periphery and having an open segment transversely thereof, an arcuate segment forming a smooth inner surface positioned in said open segment of said sleeve with the ends of the sleeve bonded to opposite ends of the arcuate segment, said arcuate segment having a boss extending transversely thereof on the outer periphery of the segment and projecting outwardly therefrom, said sleeve and said segment having a pair of parallel slits extending peripherally around the sleeve and through the boss on the inner periphery thereof to a depth at least equivalent to the cross sectional thickness of the sleeve forming thereby a central longitudinally extending ribbon disposed between longitudinally coextensively extending outer ribbons, said central ribbon having an opening between one end thereof and one side of said boss disconnecting the same therefrom, said outer ribbons each having an opening therethrough at the opposite side of said boss disconnecting the same therefrom, and connecting lugs having engaging slots on the free ends of each of said ribbons for operably connecting the same to actuating devices to compressibly actuate the band.

References Cited in the file of this patent

UNITED STATES PATENTS

| | | |
|---|---|---|
| 827,091 | Franquist | July 31, 1906 |
| 2,252,247 | Bjorge | Aug. 12, 1941 |
| 2,637,420 | Churchill | May 5, 1953 |
| 2,671,534 | Nutt | Mar. 9, 1954 |

FOREIGN PATENTS

| | | |
|---|---|---|
| 647,832 | Great Britain | Dec. 20, 1950 |